REGENERATIVE FREQUENCY SHIFTING AND PULSE SHAPING CIRCUIT

Filed Dec. 29, 1950 4 Sheets-Sheet 1

INVENTOR
C. C. CUTLER
BY M. R. McKenney
ATTORNEY

INVENTOR
C. C. CUTLER
BY M. R. McKenney
ATTORNEY

REGENERATIVE FREQUENCY SHIFTING AND PULSE SHAPING CIRCUIT

Filed Dec. 29, 1950 4 Sheets-Sheet 3

INVENTOR
C. C. CUTLER
BY M. R. McKenney
ATTORNEY

INVENTOR
C. C. CUTLER
BY M. R. McKenney
ATTORNEY

Patented Apr. 15, 1952

2,593,113

UNITED STATES PATENT OFFICE 2,593,113

REGENERATIVE FREQUENCY SHIFTING AND PULSE SHAPING CIRCUIT

Cassius C. Cutler, Gillette, N. J., assignor to Bell Telephone Laboratories, Incorporated, New York, N. Y., a corporation of New York Application December 29, 1950, Serial No. 203,273

7 Claims. (Cl. 250—27)

This invention relates to signal regeneration and to frequency shifting and more particularly to frequency shifting and regenerative pulse repeater circuits.

It is an object of this invention to regenerate microwave pulses and at the same time shift the center frequency of the pulses by a predetermined amount.

A more specific object of the invention is to determine from a microwave signal modulated with recurrent pulses and spaces which of the incoming signals were more likely to have been pulses and which were more likely to have been spaces. It is then an object to increase those signals which are determined to be pulses to a uniform amplitude and to attenuate all others to zero and at the same time to shift the center frequency of the pulses by a predetermined amount.

Another object of the invention is to reshape and retime microwave pulses and at the same time shift the position of the pulses in the frequency spectrum.

Systems wherein complex wave forms, such as speech, are transmitted by pulses, for example binary systems wherein the intelligence to be communicated is represented by pulses and spaces arranged in accordance with a particular code, are now well-known in the art. In binary systems, the pulses are originated with a uniform amplitude since it is necessary at the receiver to detect only the presence or absence of a pulse during a particular interval of time. Due to noise and other interferences, however, the pulses may become varied in amplitude and the spaces may be replaced by an appreciable signal. It is, therefore, desirable at a repeater or relay to return the pulses to a uniform amplitude and to attenuate the signal during spaces to zero so that the pulses may acquire new noise disturbances in transmission to the succeeding repeater without retaining the disturbance acquired in the preceding transmission path. It is also desirable in many relay systems to shift the frequency of the signal at the relay to overcome both the effects of overshooting a subsequent repeater and the effect of feedback from a transmitting antenna to the receiving antenna at the same repeater station.

A pulse repeater which performs the functions of retiming and reshaping is described in a copending application of which I am a joint inventor together with R. L. Carbrey and C. B. Feldman, Serial No. 176,238, filed July 27, 1950. In the repeater described therein, short samples of the incoming signal at the nominal pulse occurrence times are introduced into a loop circuit containing an expander, a limiter and a pulse amplifier. Due to the non-linear characteristics of the expender, signals above a certain level are increased in amplitude relative to signals below that level. Sufficient gain is introduced into the loop by the pulse amplifier so that the net result is that pulses above a certain amplitude are amplified while those below this amplitude are attentuated. The pulses are allowed to traverse the loop a predetermined number of times after which the incoming signals will either arrive at a standard amplitude set by the limiter or will be attenuated to substantially zero. After the predetermined number of traversals through the loop, the reshaped pulses are gated into an output circuit, and, after being further shaped by an output filter, are applied to the transmitting antenna.

There is further described in a copending application of mine, Serial No. 173,204, filed July 11, 1950, pulse amplifiers which not only amplify an applied signal but, due to the simultaneous application of a periodically varying wave, the frequency of which is related to the repetition rate or frequency of the incoming radio frequency pulses, also shifts the phase and hence the center frequency of the applied pulses by an appreciable and predetermined amount. In a specific embodiment disclosed therein, the pulse amplifier comprises a traveling wave tube the beam voltage of which is varied by the periodically varying wave to provide phase modulation of the signal pulses. As is also disclosed therein, if the amplitude range through which the periodically varying voltage swings is large enough, the amplifier will also act as a gate since, as is known, traveling wave amplifiers provide appreciable gain only over a relatively narrow range of beam voltages.

It has occurred to applicant that a frequency shifting amplifier as just described may be employed in a regenerative pulse repeater in such a manner as to achieve certain unique and desirable results. For example, by using a traveling wave amplifier as an input gating device, it it possible to obtain short and accurate samples of the incoming signal under the control of a sinusoidally varying voltage rather than under the control of short and necessarily broad band pulses. Further, it is possible to obtain by a single device both the gain which is necessary in the loop circuit and a frequency shift which may be desirable in a particular application. A further feature of the invention is that an output gate becomes unnecessary since it is possible, by including in the output circuit a filter tuned to accept only those pulses which have been shifted by the desired amount, to pass the circulating pulses to the transmitting antenna or other output circuit a the proper time.

These and other features and objects of the invention may be better understood from a consideration of the following detailed description when read in accordance with the attached drawings, in which.

Figure 4:
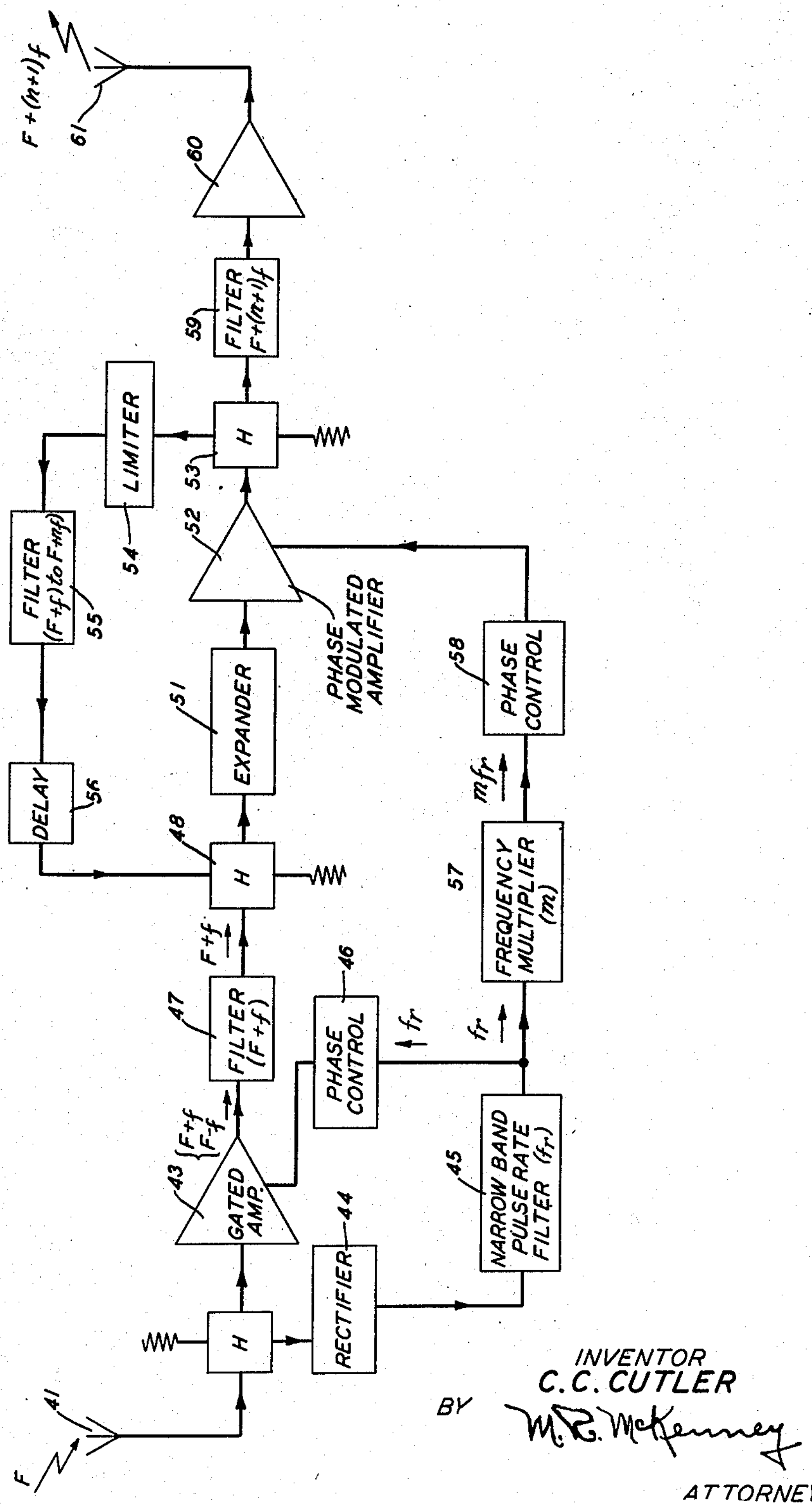
Fig. 4 is a block diagram representing schematically a frequency shifting regenerative pulse repeater employing principles of the present invention.
Figure 5:
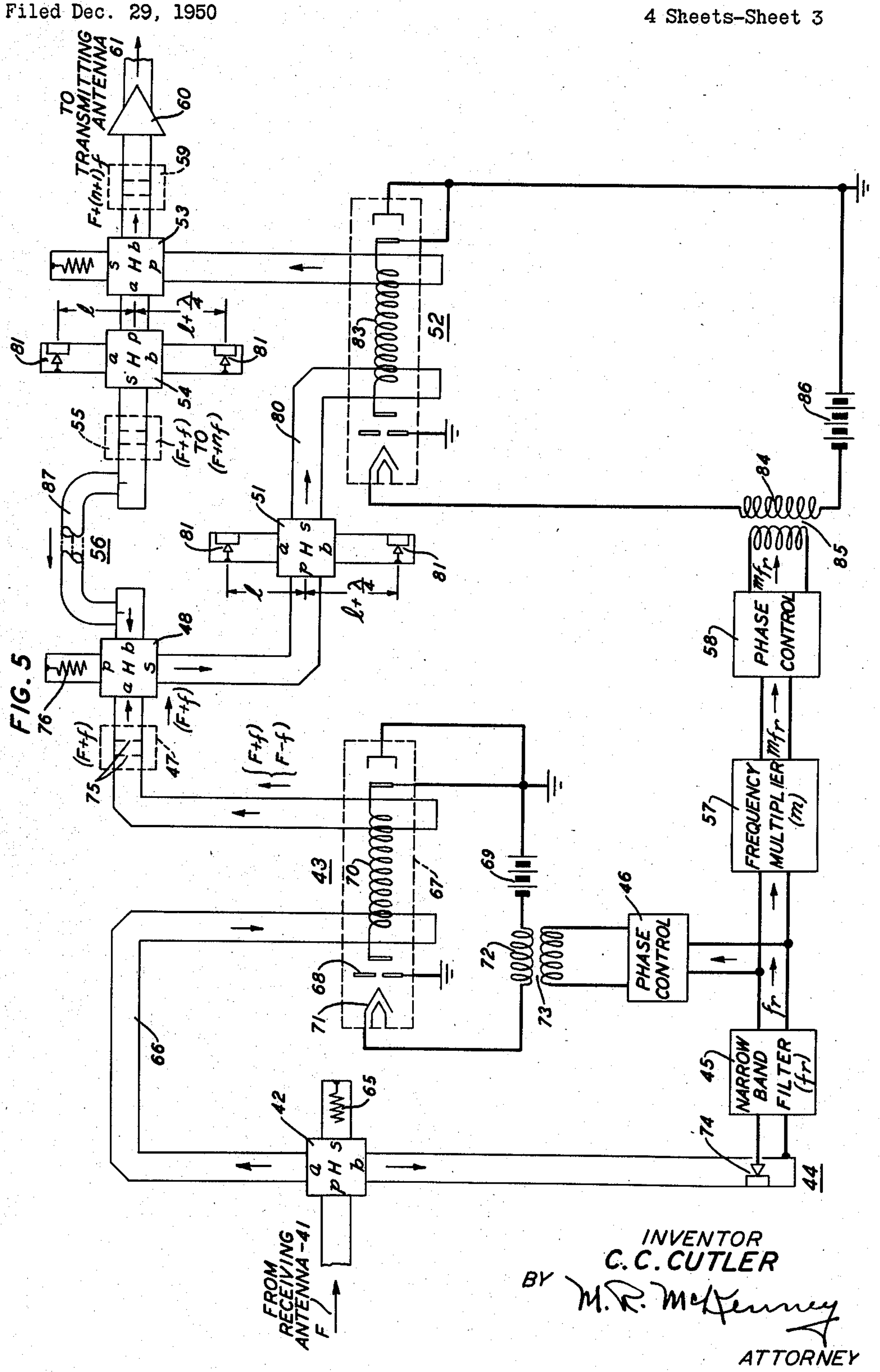
Figure 6:
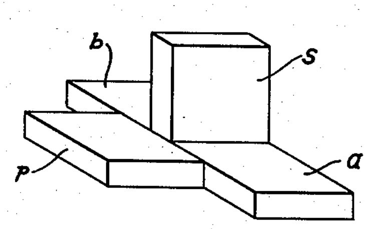
Figure 7:
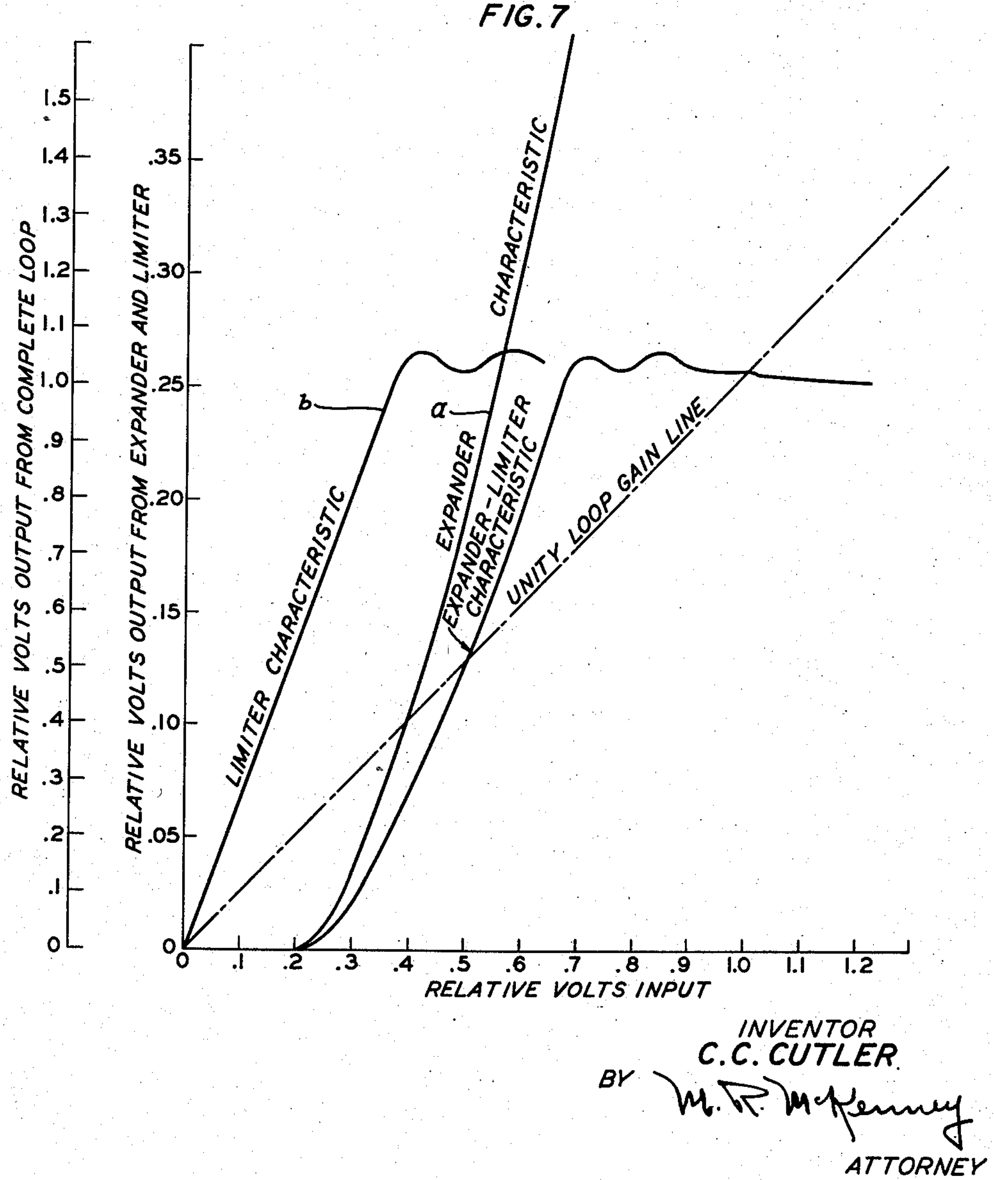

Fig. 5 schematically illustrates details of a repeater of the type shown in Fig. 4;

Fig. 6 is a pictorial representation of a hybrid junction of the type which may be used in the illustrative circuits of Figs. 4 and 5; and Fig. 7 shows expander and limiter characteristics.

As explained in my above-mentioned sole application, the center frequency of a radio frequency pulse may be shifted by applying the pulse to an amplifier to which is also applied a continuous wave modulating signal, the frequency, relative phase and mode of application being such as to produce a phase modulation of signals traversing the amplifier. The input signal may be expressed in general form as:

$$E_{in}=Ee^{j(\varpi t+\Phi_0)}$$

where $\Phi_0$ is the phase angle of the input signal, and $\varpi$ is the angular frequency.

The frequency F of the incoming signal (which may be taken as the center frequency) may be expressed in terms of the angular frequency according to the well-known relation:

$$F=\frac{\omega}{2\pi}$$

If now, the phase of the incoming signal is varied as a function of time during passage of the signal through the amplifier, the output signal may be expressed as follows:

$$E_{out}=E\cdot G(t)\cdot e^{j\left(\omega t+\Phi_0+\frac{d\Phi}{dt}\cdot t\right)}=E\cdot G(t)\cdot e^{j\left[\left(\omega+\frac{d\Phi}{dt}\right)t+\Phi_0\right]}$$

where G(t) is the gain of the amplifier as a function of time, and $$\left(\omega+\frac{d\Phi}{dt}\right)$$

represents a new angular frequency from which a new center frequency may be derived.

Such phase modulation may be applied to shift the center frequency of applied pulses in any amplifier capable of transmitting the pulses. For example, there may be employed a conventional phase modulator in which a reactance tube is connected in the anode-cathode circuit of a conventional amplifier tube receiving the pulses, the modulating voltage being applied between the grid and cathode of the reactance tube. In the case of traveling wave and velocity variation tube amplifiers, the modulating voltage may be applied to vary the beam velocity.

Figure 1:
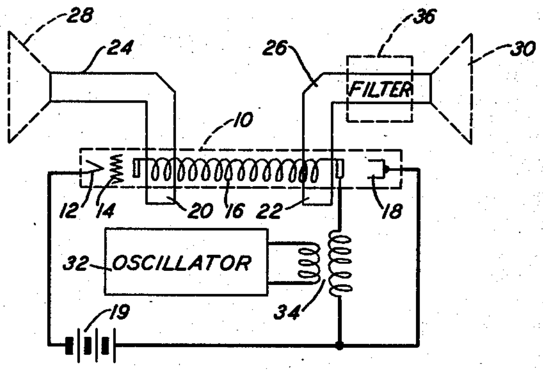
Fig. 1 is a schematic representation of a phase or frequency shifting amplifier of the type disclosed in my above-mentioned sole application.

In a specific embodiment as illustrated in Fig. 1 of the drawings, a traveling wave tube is employed as the amplifier. Such amplifiers have been described in articles in I. R. E. Proceedings for February 1947, entitled "Traveling wave tubes" by J. R. Pierce and L. M. Field at page 108, "Theory of beam type traveling wave tubes" by J. R. Pierce at page 111, and "The traveling wave tube as amplifier at microwaves" by R. Kompfner at page 124 and in a book by J. R. Pierce entitled "Travelling Wave Tubes," Van Nostrand 1950.

The amplifier shown in Fig. 1 comprises an envelope 10 having mounted therein a cathode 12, a grid 14 which in some applications may be omitted, a helix 16 and a collector 18. A source of direct-current voltage 19 is connected between the helix and cathode to render the former positive with respect to the latter, and the collector is operated at substantially the same voltage as the helix. Input and output connections to the amplifier are made by means of suitable transducers 20 and 22 connected to input and output wave guides 24 and 26. Input and output antennas 28 and 30, respectively, indicated in Fig. 1 as comprising horn type antennas may be connected to the corresponding wave guide circuits to permit use of the amplifier as a radio frequency repeater. Radio frequency pulses applied to the input of the amplifier through wave guide 24 may be phase modulated by varying the velocity of the electron beam while each of the pulses is traversing the amplifier. This may be accomplished by applying a periodic wave between the cathode and helix in series with the direct-current supply 19. As shown in Fig. 1, for example, a continuous wave is generated in an oscillator 32 and applied to the primary winding of a transformer 34, the secondary winding of which is inserted in the cathode-helix supply circuit.

Figure 2:
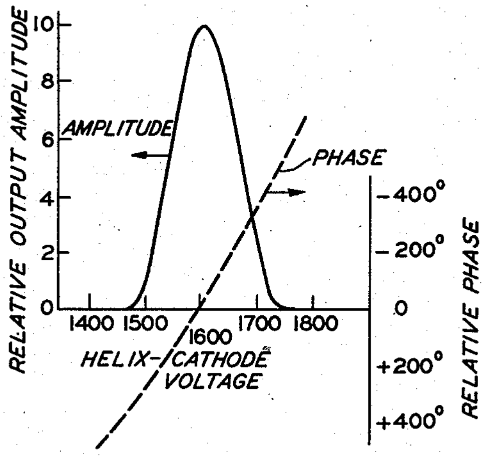
Fig. 2 is a graph illustrating certain of the characteristics of a circuit of Fig. 1.

As pointed out in the articles referred to above, energy applied to the input of a traveling wave amplifier is amplified only when the velocity along the helix of the input electromagnetic wave approximates the velocity of the electron beam as determined by the cathode-helix or beam voltage. The range of beam voltages for which amplification takes place is relatively limited and is shown for a typical traveling wave amplifier by the solid curve of Fig. 2. If, however, the phase modulating signal varies the beam voltage within the range so delineated, the phase of the output signals may be shifted relatively to that of the input signal. The dashed-line curve of Fig. 2 illustrates the extent of the phase shift obtainable in this fashion and it will be noted that positive and negative shifts of phase with corresponding changes in the center frequency of the applied radio frequency pulses may be obtained by varying the beam voltage to one side or the other of the value produced by the direct-current supply.

Experiments have shown that for pulses of center frequencies of about 4,000 megacycles, it is possible to produce a shift in center frequency as great as 500 megacycles. If, therefore, the frequency of the phase modulating signal from oscillator 32 is properly related to the repetition frequency of the pulses applied to the traveling wave amplifier and the two signals are properly phased, each pulse occurs during the time in which the same relative change in transmission velocity is made within the traveling wave tube and each of the pulses traversing the amplifier is, therefore, given the same shift in center frequency. Ordinarily this is best accomplished by making the frequency of the modulating signal equal to the repetition rate or frequency of the pulses. If the frequency of the phase modulating signal is an even submultiple of the repetition frequency of the pulses, alternate pulses may be shifted in center frequency in opposite senses. If the use of such a phase modulating frequency is desirable for other reasons, it may be convenient to include a filter 36 in the output circuit of the amplifier to reject pulses in which the undesired frequency shift is produced.

In accordance with an additional feature of the invention, a frequency shifting pulse repeater employing a traveling wave tube is operated in such a way as to provide pulse shaping or gating action without the necessity of using any additional equipment. This pulse shaping or gating action is produced by suitable choice of the characteristics of the continuous wave signal used to obtain frequency shifting. It will be recalled from the above that the traveling wave tube amplifier will give effective amplification only when the beam voltage falls within a relatively restricted range of values as indicated in Fig. 2. If, during the time that electromagnetic energy is passing along the helix of the traveling wave tube, the beam voltage is swept through the range of values referred to above, the amplification afforded by the tube will be correspondingly varied. Thus, where the rate of change of beam voltage is such that during the time a radio frequency pulse is progressing along the helix of the tube, the beam voltage is swept from a value below the range permitting amplification through the amplifying region and beyond, certain portions of the pulse will be amplified to a greater extent than others.

Figure 3:
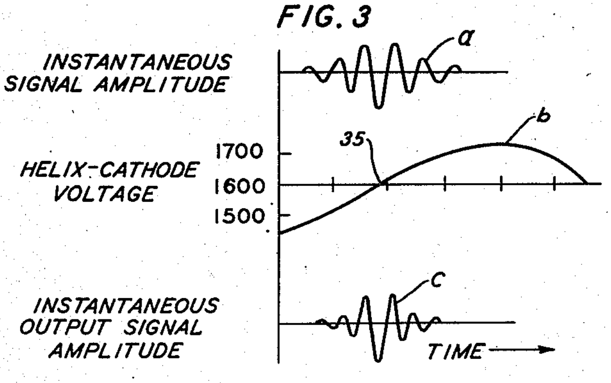
Fig. 3 shows a series of curves illustrating certain aspects of the operation of the circuit of Fig. 1.

The effect of such variation in amplification during the time in which a radio frequency pulse is traversing the traveling wave tube, is illustrated by the curves of Fig. 3. Curve *a* illustrates a typical radio frequency pulse of the type which may be employed in microwave pulse modulation systems. If, while this pulse is passing through a traveling wave amplifier having the characteristics shown in Fig. 2, the amplification thereof is varied by changing the helix-to-cathode voltage as shown in curve *b*, the net result will be the production of a pulse as shown in curve *c* which is sharper than the applied pulse, since the maximum amplification occurs only during the center portion of the pulse. Since the change in beam voltage also produces phase modulation as described above and depending upon the sense in which the helix-to-cathode voltage is changing at the time the pulse passes through the amplifier, the center frequency of the pulse may be increased or decreased at the same time that sharpening of the pulse occurs. Necessarily, the extent to which a pulse is sharpened depends upon the rate at which the beam voltage is swept through the critical range. Where the signal injected to produce frequency shifting and pulse sharpening is sinusoidal, the maximum time rate of change of beam voltage occurs as the sine wave passes through zero amplitude as indicated at 35 on curve *b* of Fig. 3. The slope of the modulating wave at this point and thus the pulse sharpening or gating action may be varied either by increasing the frequency of the modulating sinusoid or by increasing the amplitude of the wave so that the entire range of amplification of the traveling wave tube is covered by a relatively small part of the total amplitude of the modulating wave.

This action of the traveling wave amplifier in response to the variation of beam voltage may thus be made so pronounced that pulses may be gated or generated from a continuous radio frequency wave applied to the amplifier in lieu of the pulse input heretofore considered. Under such circumstances, because the helix-to-cathode voltage varies sinusoidally, pulses will be produced at the output of the amplifier twice during each cycle of the modulating wave and will have center frequencies which are alternately higher and lower than the original frequency of the continuous wave input signal. In one typical system, pulses as short as 0.002 microsecond have been produced by gating a continuous wave input having a frequency of 4,000 megacycles per second. If it is desired to produce a train of output pulses all having the same center frequencies, the unwanted pulses of the other frequency may be eliminated through the provision of a filter in the output circuit; for example, the filter 36 in wave guide 26 as shown in Fig. 1. Since the frequency shift may be as great as 500 megacycles, it is possible to separate the alternate pulses with conventional wave guide filters. Alternatively, the beam of the traveling wave tube may be turned off by application to grid 14 of a suitable blanking signal during the time in which the undesired pulse would ordinarily be generated by phase modulation of the tube. Such a blanking signal could conveniently be obtained from the modulating oscillator 32.

The general operation of a specific repeater illustrative of the present invention will now be described with particular reference to Fig. 4. The incoming signal comprising pulses having a center frequency *F* and a given repetition rate and which, for example, may be a pulse code modulation signal, is received by the antenna 41 and applied to the hybrid junction 42. The hybrid junction 42 acts to divide the applied enegry between the gated amplifier 43 and the rectifier 44. The gated amplifier 43 is actuated at the repetition rate of the input pulses by a sinusoidally varying voltage derived from the input signal by the rectifier 44 and the narrow band filter 45 which is tuned to the nominal pulse repetition rate, $f_r$. The output of the gated amplifier therefore comprises narrow segments of the incoming signal which are proportional to the amplitude of the signal at the normal pulse occurrence times. If the gated amplifier 43 comprises a traveling wave tube, these segments will be shifted in frequency by an amount $f$, and since the incoming signal is in the nature of a continuous or relatively slowly varying wave, there will be in the output of the amplifier 43 components of both the frequency $(F+f)$ and $(F-f)$. If the sinusoidally varying control wave which actuates the amplifier is phased by any well-known means 46 to that the segments of frequency $F+f$ occur at the normal pulse occurrence times, the components $F-f$ will occur midway between the pulse occurrence times and these latter elements are removed by the filter 47 whose pass band includes only the higher frequency components.

The samples passed by the filter 47 are applied to the hybrid junction 48 which comprises the input to the loop circuit, the loop circuit comprising the expander 51, the phase modulated amplifier 52, the hybrid junction 53, the limiter 54, the filter 55, and the delay circuit 56. These elements may be arranged in any desired order, the circuit in Fig. 4 being merely illustrative. Further the functions of the devices illustrated separately may be obtained by a lesser number of devices by employing multifunction units. For example, the delay may be incorporated in the connecting lines or wave guide. Due to the conjugate relationship of the hybrid junction arms, the samples applied to the hybrid 48 from the filter 47 are applied only to the expander 51 and not to the delay circuit 56. The expander increases the amplitude of the higher level signals relative to the amplitude of the lower level signals as previously mentioned with an upper limit being determined by the limiter 54. If the pulses were originally transmitted with a uniform amplitude, and if it is determined that incoming signals at the pulse occurrence times of greater than one-half of this standard amplitude are more likely to have originated as pulses than as spaces, and if it is likewise determined that signals below one-half this standard amplitude are more likely to have been noise acquired in the transmission, the amplifier 52 is adjusted to give the loop unity gain for pulses of one-half the standard amplitude. Therefore, as the pulses circulate through the loop, those of greater than one-half standard amplitude will be increased until they reach a maximum amplitude determined by the limiter 54 and those below one-half standard amplitude will be attenuated to substantially zero, both of these being conditioned on a sufficient number of traversals through the loop. Suitable delay is introduced into the loop by the delay circuit 56 so that the circulating pulses will return to the input hybrid junction 48 at the proper time and so as not to interfere with subsequent pulses which are being applied to the hybrid junction 48.

The amplifier 52 is phase modulated by a sinusoidally varying voltage having a frequency which is some integral multiple $m$ of the nominal pulse repetition rate; this control wave is derived from the output of the narrow band filter 45 by the frequency multipler 57 and phased by the phase control circuit 58. The number $m$ will depend on the spacing between the pulse samples as they traverse the loop and hence will depend on the number of traversals each sample makes before it passes to the output circuit. If the frequency shift introduced by the amplifier 52 is $f$, as was the shift introduced by the gated amplifier 43, the center frequency of each pulse will be shifted an amount $nf$ during its traversals through the loop where $n$ is the number of traversals. The filter 55 in the loop is therefore designed to accept all pulses within the range of the input pulses to the loop and the output pulses, more exactly, to have a pass band including $(F+f)$ to $(F+nf)$ and to reject pulses of frequencies $F+(n+1)f$ or higher. Until they have completed $n$ traversals through the loop, the pulse segments are continuously rejected by the filter 59 to which they are also applied since its lowest cut-off frequency is greater than $(F+nf)$. Its cut-off frequency, however, lies between $F+nf$ and $F+(n+1)f$ so that after the $n$th traversal through the amplifier 52, the samples will be rejected by the filter 55 in the loop and will be passed by the filter 59 to an output amplifier 60 and hence to the transmitting antenna 61. The filter also serves to narrow the band of the broad band samples applied to it so that the output pulses are in general rounded.

Details of an illustrative circuit of the type shown in Fig. 4 are illustrated by the circuit shown in Fig. 5. The input signals from the receiving antenna enter the $p$-arm of the wave guide hybrid junction 42. A wave guide hybrid junction is illustrated pictorially in Fig. 6 and is disclosed in detail in Patent 2,445,895 to W. A. Tyrrell, dated July 27, 1948. The $p$ and $s$-arms and the $a$ and $b$-arms are, respectively, in a conjugate relation so that there will be no direct coupling between either the $p$ and $s$-arms or between the $a$ and $b$-arms. The arm joined in the electrical plane of the colinear arms is called the parallel or $p$-arm since electromagnetic energy entering this arm will be in phase in the $a$ and $b$-arms at equal distances from the junction. Similarly, the arm joined in the magnetic plane is called the series or $s$-arm from the phase relationship of energy entering the $a$ and $b$-arms from the $s$-arm. The hybrid junction as used herein makes no especial use of the conjugacy feature but is employed merely as a convenient branching means. The $s$-arm in the hybrid junction in Fig. 5 is terminated by the impedance 65 in its characteristic impedance to absorb any energy which may be reflected into it from either the $a$ or $b$-arms to prevent its further reflection back into the $p$-arm and hence to the receiving antenna.

Energy entering the $a$-arm of the hybrid junction 42 is applied by the wave guide 66 to the input of a traveling wave amplifier 67 similar to the amplifiers shown in detail in Fig. 1 and includes a focusing anode 68 which is at substantially the same potential as the helix. The beam voltage for the traveling wave amplifier 67 is primarily determined by the voltage of the biasing battery 69 which is connected between the helix 70 and the cathode 71. However, there is connected in series with the biasing path the secondary 72 of a transformer 73 by which the control wave varying sinusoidally at the nominal pulse rate, derived from the incoming signal by the crystal rectifier 74 and the narrow band filter 45 may be superimposed on the direct-current bias. In the absence of a control wave, the bias is normally adjusted so as to give the tube 67 maximum gain. For example, if the tube has the gain characteristic shown in Fig. 2, the voltage of the battery 69 would be adjusted to approximately 1600 volts.

The net effect of the circuit just described is to superimpose the sinusoidally varying control voltage upon the cathode-helix direct-current voltage supplied by the biasing battery 69. This will cause the beam voltage to vary through a range depending on the amplitude of the control voltage. By properly proportioning the turns ratio of the transformer 73, the range through which the control voltage swings is made large relative to the critical range over which the tube 67 provides gain so that the tube acts as a gate as well as an amplifier. The control voltage is properly phased by the phasing control 46 so that the control voltage will swing through zero on either its positive or its negative excursion at the center of the normal pulse occurrence times at the input of the tube 67. For the present illustration, it will be assumed that this control voltage which phase modulates the amplifier swings through zero on its positive excursion, a positive excursion being such that the sinusoidal control voltage aids the battery 69, at the pulse occurrence times so that the desired samples of the incoming signal will be given an increase in frequency by the amplifier. The segments gated midway between the pulse occurrence times have their center frequency decreased and are rejected by the filter 47 comprising the spaced irises 75 which accepts only the higher frequency components in the output of the traveling wave amplifier 67. The filter 47, as well as filters 55 and 69, may comprise any of the known wave guide filters, some of which are disclosed, for example, in an application of W. D. Lewis, Serial No. 789,985, filed December 5, 1947, which issued as Patent 2,531,447, on November 28, 1950.

The gating control circuit, comprising the rectifier 74, filter 45, and phasing circuit 46 is designed with sufficient "fly-wheel" effect so that the gating of the input signal by the amplifier retimes the pulses to an extent. If the inaccuracy in timing of the input pulse is slight, the pulse will generally be relocated in its proper time interval without loss of intelligence.

The output of the traveling wave amplifier 67 which passes the filter 47 comprises the desired samples of the incoming pulses and is applied to the $a$-arm of the hybrid junction 48 which is similar to the hybrid junction 42. Energy entering the $a$-arm divides between the $p$ and $s$-arms, the energy entering the $p$-arm being absorbed since this arm is terminated by the impedance 76 in its characteristic impedance. The pulse segments entering the $s$-arm of the hybrid junction 48 commence their traversals through the loop and first pass through the expander 51.

The expander 51 comprises a hybrid junction of the type shown in Fig. 6 but with the $a$ and $b$-arms terminated by crystal rectifiers 81. The crystals 81 provide a variable impedance termination for the colinear arms $a$ and $b$ and control the amount of energy that is reflected by these arms due to impedance mismatch. One of the colinear arms, the $b$-arm in the illustrative circuit, is a quarter of a wavelength longer than the other $$\left(l+\frac{\lambda}{4}\right)$$

so that the energy is reflected from the $a$ and $b$-arms into the $s$-arm in an additive manner.

An expander characteristic is illustrated by curve $a$ of Fig. 7 and is obtained by matching the impedance of the crystals 81 to the impedance of their corresponding wave guide arms at a low signal amplitude. This results in substantially no reflection of the low levels from the $a$ and $b$-arms and hence relatively high attenuation of such signals. As the input level increases the $a$ and $b$-arms become progressively mismatched due to the non-ohmic resistance characteristic of crystal rectifiers so that the higher levels will be more completely reflected into the $s$-arm. The level at which the crystals are matched to their respective wave-guide arms may be controlled by impedance matching devices in any well-known manner. An expander of this type is disclosed in a copending application of mine, Serial No. 118,890, filed September 30, 1949.

The expanded output appearing in the $s$-arm of the expander is applied by the wave guide 82 to the input of the traveling wave amplifier 83. This amplifier is similar to the gating amplifier 67 and also has the secondary 84 of a transformer 85 connected in series with the cathode-helix biasing battery 86 so that the phase modulating voltage may be superimposed on the beam voltage. The amplitude of the control wave applied to this amplifier 83 need not be as great as that of the control wave applied to the gating amplifier 67 since no gating functions are to be performed. However, since there will be a plurality of pulses traveling the loop at any one time, a number of pulses equal to the number of pulses traversing the loop will arrive at the input of the amplifier 83 during any one pulse period. Therefore, in order to shift the frequency of each of these pulse segments, it is necessary that the modulating voltage have a frequency which is a function of the rate of arrival at the amplifier 83 of the pulse segments traversing the loop and hence which is an integral multiple $m$ of the pulse rate. The control voltage for amplifier 83 is therefore derived by applying a portion of the output of the narrow band filter 45 to a frequency multiplier 57 whose output is applied to the transformer 85. Suitable phasing means 58 may be included between the frequency multiplier 57 and the transformer 85 to insure proper timing of the control wave.

Since the input to the amplifier 83 comprises pulses instead of a continuous wave, the output of the amplifier 83 will comprise only pulses shifted in frequency in the same sense and there will be no problem of rejecting unwanted pulses in the amplifier output. Assuming again that the frequency shift applied by the amplifier is $f$ and in a positive sense, the pulse segments applied to the amplifier now shifted upwards in frequency by an amount $f$ are next applied to the $p$-arm of the hybrid junction 53. Energy entering the $p$-arm of the hybrid junction divides between the $a$ and $b$-arms. Connected in the $b$-arm, however, is a filter which will accept only pulses having a center frequency of $F+(n+1)f$ or higher so that until the pulse samples have completed $n$ traversals through the loop, they will not pass to the transmitting antenna.

Instead, they will be applied to the limiter 54 which is similar in structure to the expander 51 but which has the crystal rectifiers matched to their respective arms at a predetermined high level to limit the amplitude of the pulse segments to the desired standard amplitude. A limiter characteristic is shown as curve $b$ in Fig. 7. The net effect of the expander 51 and limiter 54 is illustrated by the combined expander-limiter characteristic shown by curve $c$ of Fig. 7. At lower signal levels, the action of the expander predominates while the limiter prevents the higher levels from exceeding a predetermined peak amplitude, herein referred to as unity standard amplitude. A limiter of the type described is disclosed in a copending application of A. F. Dietrich Serial No. 118,856, filed September 30, 1949. The output of the limiter is passed through a filter 55 and a delay circuit 56 which is illustrated as comprising a section of coaxial cable 87 cut to the proper length and returned by way of the $b$-arm of the hybrid junction 48 to the input of the loop to retraverse the same. The filter 55 has a pass band such that it will accept pulses having center frequencies in the range $(F+f)$ to $(F+nf)$ but will reject frequencies of $F+(n+1)f$ or higher. Pulses entering hybrid junction 53 therefore go either to the transmitting antenna 61 or retraverse the loop, depending on their center frequency and hence on whether or not they have completed the desired number of traversals.

As previously mentioned, it is desired to reduce all pulse segments of less than one-half of a standard amplitude to zero on the assumption that such segments are, in fact, noise or the like.

It is also desired to increase all pulse segments of greater than one-half standard amplitude to unity standard amplitude, or to limit them to this value if previously greater on the assumption that such signals are, in fact, signal bearing pulses. Thus, a pulse of exactly one-half standard amplitude should theoretically remain unchanged by the loop, except for changes in frequency, and hence controls the loop gain.

The curves of Fig. 7 have been plotted with a double ordinate. The right-hand ordinate indicates the relative output of only the expander and/or the limiter. The left-hand ordinate indicates the relative output of the complete loop and includes the amplification introduced by the amplifier 83 as well as the distributed losses in the loop. Superimposed on the aforementioned curves is a unity loop gain line. By proper control of the gain of the amplifier, the unity loop gain line is made to intersect the combined expander-limiter characteristic at one-half standard amplitude relative input whereby a pulse of this amplitude will theoretically circulate unchanged by the expander and limiter. In a practical case, small variations will vary such a pulse sufficiently to cause it to go one way or the other.

From the characteristic of the complete loop, it may be seen that the loop gain is reduced below unity as the signal level decreases below one-half standard amplitude. For pulses of greater than one-half standard amplitude, the loop has a gain of greater than unity as long as the pulses do not exceed the limit set by the limiter. For the characteristic shown, the loop gain increases as the input level approaches .7 unit of standard amplitude at which level the limiter prevents any appreciable further increases. Inputs of greater than .7 unit reappear at the expander input with unity standard amplitude.

In addition to the changes in amplitude being effected on the pulse segments by the expander 51, limiter 54 and amplifier 83, the center frequency of the pulse segments is increased by an amount $f$ each time they traverse the amplifier. These segments will therefore continue to circulate until they have completed $n$ traversals at which time they will no longer be accepted by the filter and will instead pass through the output filter to the transmitting antenna. As previously mentioned, the output filter broadens the narrow pulse segments. It will be noted that no gating means are required to extract the circulating pulse from the loop at the proper time.

The signal pulses therefore appear at the output retimed, by the gated amplifier 43, reshaped, by the expander 51 and limiter 54, and shifted in frequency, by the phase modulated amplifier 52.

If a conventional gated amplifier is employed for the input gate so that no frequency shift is imparted at the input, the filter 55 will be adapted to accept pulses whose center frequencies lie in the range $F$ to $F+(n-1)f$ while rejecting frequencies of $F+nf$ while filter 59 would have a pass band accepting frequencies of $F+nf$ while rejecting frequencies of $F+(n-1)f$ or lower. Further, if the frequency shift imparted by the phase modulating amplifier 83 is $f'$ instead of $f$, the pass band of filter 55 should include $(F+f)$ to $[(F+f)+(n-1)f']$ and filter 59 should accept the frequency of $[(F+f)+nf']$. Other combinations are also possible, for example, the frequency shift imparted by the gated amplifier may be in a different sense to that imparted by the amplifier so that the filter pass bands would include for filter 55, $(F\pm f)$ to $[(F\pm f)\pm(n-1)f']$ and for filter 59 $[(F\pm f')\pm nf']$.

Although the invention has been described as relating to specific embodiments, other modifications and embodiments will readily occur to one skilled in the art so that the invention should not be deemed limited to specific illustrations set forth herein.

What is claimed is:

1. A pulse shaping circuit for a signal comprising periodic pulses of center frequency F comprising means for obtaining narrow pulses from said signal which are representative of the signal amplitude at the normal pulse occurrence times, a pulse amplifier, means to apply said pulses to said amplifier, means to phase modulate the pulses traversing said amplifier at a frequency which is an integral multiple of the pulse repetition rate to shift the center frequency of said pulses by an amount $f$ for each trip through said amplifier, a circuit for reapplying the output of said amplifier to its input which includes an expander, a limiter, and a first filter which will pass pulses having a center frequency in the range of F to F plus the absolute value of $(n-1)f$, where $n$ is an integer equal to the desired number of traversals through said amplifier and an output circuit for said amplifier which includes a second filter which will pass pulses having a center frequency of F plus the absolute value of $nf$.

2. A pulse shaping frequency shifting circuit for signals modulated with recurrent pulses having a center frequency F which comprises means to derive from said signals a control wave having a frequency equal to the pulse repetition rate, an input gate under control of said control wave for gating a narrow segment of the input signal at the normal pulse occurrence times, means to apply said narrow segments to a loop circuit which includes means to increase the segments above a predetermined amplitude to a standard amplitude and to attenuate segments below said predetermined value, a first filter, and a pulse amplifier, means to obtain from said signals a second control wave whose frequency is an integral multiple of said first control wave, means to apply said second control wave to said amplifier to phase modulate the signals passing therethrough and thereby shift the center frequency of said pulse segments by an amount $f$, an output circuit including a second filter, and means to apply the output of said amplifier to said output circuit, said first filter having a pass band including $F$ to $F$ plus the absolute value of $(n-1)f$, where $n$ is an integer denoting the desired number of traversals through said amplifier for said segments, but excluding $F$ plus the absolute value of $nf$, and said second filter having a pass band including $F$ plus the absolute value of $nf$ but excluding $F$ plus the absolute value of $(n-1)f$.

3. A pulse repeater for periodic pulses having a center frequency $F$ which comprises an input gate, means to apply an input signal to said gate, said gate comprising a traveling wave amplifier having an electron beam with which an applied signal interacts, means to periodically vary the velocity of the electrons in said beam at a rate equal to the pulse repetition rate whereby short samples of said input signal shifted in frequency by an amount $f$ are obtained in the output of said amplifier, means to apply said samples to a loop circuit comprising means to fix the amplitude of said samples at one of two uniform values, a pulse amplifier, and a first filter, means to phase modulate the signals traversing said pulse amplifier at a rate equal to an integral multiple of the pulse repetition rate whereby the center frequency of the samples traversing said amplifier are shifted in frequency by an amount $f'$, an output circuit including a second filter, and means to apply the output of said pulse amplifier to said output circuit, said first filter having a pass band including $[(F+f)+(n-1)f']$ but excluding $[(F+f)+nf']$, where $n$ is an integer denoting the desired number of traversals for said samples through said amplifier, and said second filter having a pass band including $[(F+f)+nf']$ but excluding $[(F+f)+(n-1)f']$.

4. The combination in accordance with claim 3 and filtering means in the output of said traveling wave amplifier to reject alternate pulse samples.

5. In a pulse repeater for periodic pulses having a center frequency F and a given repetition rate, an input gate for obtaining narrow samples of said pulses at the centers of the normal pulse occurrence times, a traveling wave amplifier having an electron beam, means to apply said samples to said traveling wave amplifier, means to vary the beam voltage of said amplifier at a rate equal to an integral multiple of said given pulse repetition rate whereby the center frequency of the samples traversing said amplifiers is shifted in frequency by an amount $f$ for each trip through said amplifier, a first circuit connected to the output of said amplifier for reapplying said pulse segments to the input of said amplifier, said first circuit including an expander and a filter having a pass band including $F$ to $F\pm(N-1)f$ but excluding $F\pm nf$ where $n$ is an integer denoting the desired number of traversals through said amplifier for said samples, and a second circuit also connected to the output of said amplifier including a second filter having a pass band including $F\pm nf$ but excluding $F\pm(n-1)f$.

6. In a system for the transmission of intelligence by signal waves modulated with recurrent pulses and spaces, said pulses having a center frequency F and a given repetition rate, means to derive from said signals a control wave having a frequency equal to said given repetition rate, a traveling wave amplifier having electron beam forming means, means to apply input signals to said amplifier, means to apply said first control wave to said amplifier to vary the voltage of said electron beam whereby narrow samples of said signal wave shifted in frequency by an amount $f$ are obtained, a second traveling wave amplifier having an electron beam, means to apply the output of said first amplifier to the input of said second amplifier, means to obtain from said first control wave a second control wave having a frequency equal to an integral multiple of the frequency of said first control wave, means to apply said second control wave to said second amplifier to vary the voltage of its electron beam, whereby the signals traversing said second amplifier are shifted in frequency by an amount $f$, a circuit for reapplying the output of said second amplifier to the input thereof including an expander, a limiter, and a first filter, an output circuit including a second filter connected to the output of said second amplifier, said first filter adapted to pass pulses whose center frequency lies in the range of $(F+f)$ to $(F+nf)$ but which excludes pulses having a center frequency equal to $F+(n+1)f$, and said second filter adapted to pass pulses whose center frequency is equal to $F+(n+1)f$ but which excludes pulses having a center frequency equal to $(F+nf)$, where $n$ is an integer.

7. The combination in accordance with claim 6 wherein the frequency shift imparted by said second amplifier is $f'$, wherein said first filter is adapted to pass pulses whose center frequency lies in the range of $(F\pm f)$ to $[(F\pm f)\pm(n-1)f']$ but which excludes pulses having a center frequency equal to $[(F\pm f)\pm nf']$ and wherein said second filter is adapted to pass pulses having a center frequency equal to $[F\pm f)\pm nf']$ but which excludes pulses having a center frequency equal to $[(F\pm f)\pm(n-1)f']$.

CASSIUS C. CUTLER.

No references cited.